(12) United States Patent
Gopu et al.

(10) Patent No.: US 11,687,496 B2
(45) Date of Patent: Jun. 27, 2023

(54) SYNCHRONIZATION OF DISTRIBUTED DATA FILES

(71) Applicant: Hewlett Packard Enterprise Development LP, Houston, TX (US)

(72) Inventors: Upendra Gopu, Bangalore Karnataka (IN); Sudhakarareddy Mallavarapu, Bangalore Karnataka (IN); Dharmendra Chaudhary, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/401,668

(22) Filed: Aug. 13, 2021

(65) Prior Publication Data
US 2022/0300460 A1 Sep. 22, 2022

(51) Int. Cl.
*G06F 16/178* (2019.01)
*G06F 16/176* (2019.01)

(52) U.S. Cl.
CPC ........ *G06F 16/178* (2019.01); *G06F 16/1774* (2019.01)

(58) Field of Classification Search
USPC ........................................................ 707/626
See application file for complete search history.

(56) References Cited

U.S. PATENT DOCUMENTS

| | | | |
|---|---|---|---|
| 8,352,870 B2 | 1/2013 | Bailor et al. | |
| 9,703,798 B2 | 7/2017 | Srinivasan et al. | |
| 10,929,357 B2* | 2/2021 | Gowdappa | G06F 16/2329 |
| 2006/0271606 A1* | 11/2006 | Tewksbary | G06F 16/172 |
| | | | 707/999.203 |
| 2008/0154905 A1* | 6/2008 | Paalasmaa | G06F 16/9577 |
| 2008/0320225 A1* | 12/2008 | Panzer | H04L 67/02 |
| | | | 711/E12.017 |
| 2013/0254163 A1 | 9/2013 | Savage et al. | |
| 2016/0154817 A1 | 6/2016 | Mason, Jr. et al. | |
| 2018/0075057 A1* | 3/2018 | Lopez | G06F 16/148 |
| 2019/0005106 A1* | 1/2019 | Kalach | G06F 11/2094 |
| 2020/0050588 A1* | 2/2020 | Bhogal | G06F 16/1787 |

OTHER PUBLICATIONS

US 9,900,298, 3/2006, Shirriff (withdrawn)

\* cited by examiner

*Primary Examiner* — Cam Linh T Nguyen
(74) *Attorney, Agent, or Firm* — Hewlett Packard Enterprise Patent Department

(57) ABSTRACT

Examples described herein relate to the synchronization of distributed data files. A host node acquires a lock file including a first nodes-list and a second nodes-list from a central node storing a central copy of data files. A nearest node from the first nodes-list may be identified if the identity of the host node is not indicated in the first nodes-list. The host node obtains an updated portion of a latest version of the data files from the nearest node for synchronizing a local copy. The host node performs modifications on the local copy and updates the lock file by indicating the identity of the host node in the first nodes-list and the second nodes-list. The host node provides a modified portion of the local copy to the central node for synchronizing the central copy with the local copy.

20 Claims, 8 Drawing Sheets

SYNCHRONIZATION OF DISTRIBUTED DATA FILES

BACKGROUND

Cloud computing facilitates enhanced performance and delivery of applications and services by distributing computational workload across a network of computers or servers through virtualization. Applications may be developed as a set of microservices running in containers. A container packages up a workload and workload dependencies so that the workload is executable in servers located in various geographical locations. Each workload may include configuration settings, properties, and attributes that may be stored in data files. The data files may be stored locally on a host server or at a remote storage location.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
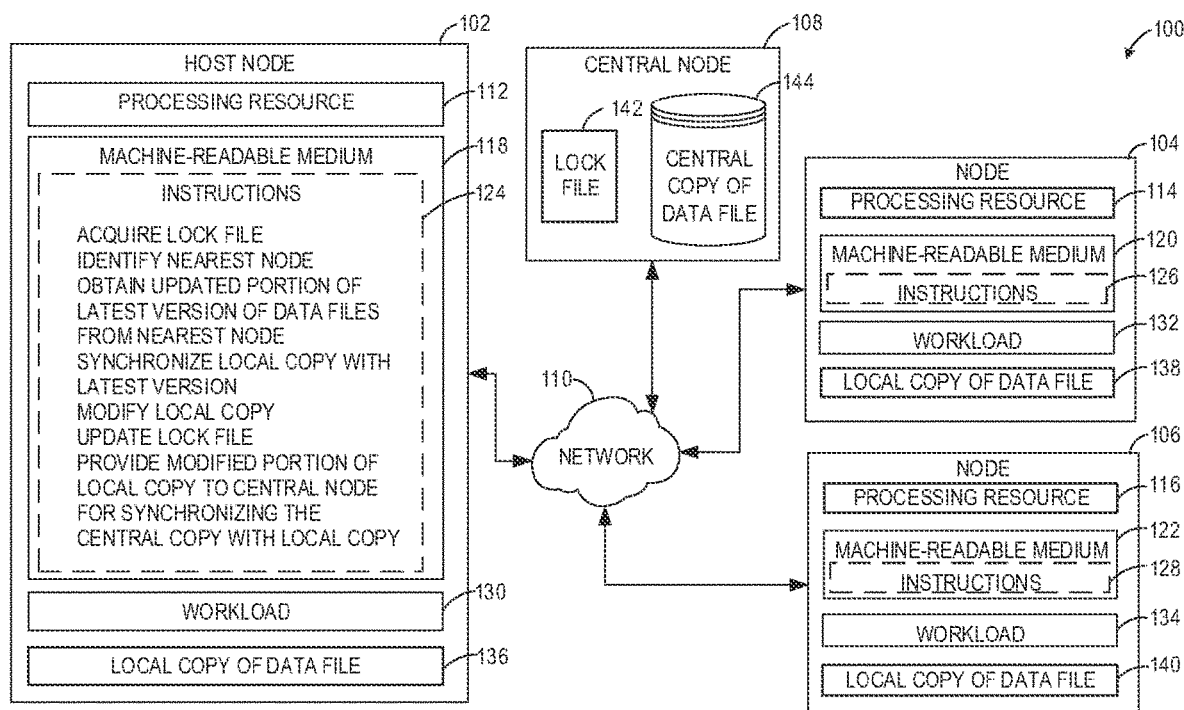
FIG. 1 depicts an example networked system for synchronizing data files in a distributed network of nodes, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Cloud computing facilitates enhance performance and delivery of applications and services by distributing computational workload across a network of computers or servers through virtualization. Applications or workloads may be developed as a set of microservices running in containers. A container packages up a workload and workload dependencies so that the workload is executable and spawned in distinct servers located in various geographical locations over a wide area network, thereby providing improved services to consumers globally.

Examples of the workloads may include, but are not limited to, a containerized application, a container, a pod, a virtual machine, or any piece of code that can be realized as a microservice. Workloads may be managed via a workload orchestration system. Various features of cloud computing, such as microservice architecture, modern design, containerization, automation, etc., allow faster development and delivery of new workloads and faster times for issue resolution.

Many cloud-based applications are developed with a linked in database library, such as a relational database, which provides on-disk data storage. Such applications may store a copy of the data foes locally on the deployed server. The data files may include configuration settings, properties, and attributes of the applications. The scaling of such applications to a duster of servers involves several challenges. For instance, if a transaction or modification on the data file is performed by an application instance at one server, then other instances of the same application deployed on other servers might be unaware of those transactions.

In some solutions, such as in hybrid cloud environments, the data used by the applications may be stored at a centralized server, which in some examples, may be a remote server. Whenever an application requests the latest version of a data file, the data may be accessed from the central server for synchronizing and updating the local data files. However, in this example, the applications accessing the same data files stored at the common centralized server may run slower than expected due to high latency and low bandwidth. For example, delayed communication may result where the servers are located at a large distance from the centralized storage and/or the data files shared are large.

Changing the type of database, e.g. to a client-server database, may introduce problems. For instance, other types of databases may not provide automatic discovery or synchronization of newly instantiated applications and associated data files in the network. Particularly, other databases may not provide synchronization of the distributed data files if new applications are spawned or deployed in other cloud environments over the wide area network. Even if synchronization is achieved, significant network overhead may be introduced. Furthermore, applications may be coded to use an on-disk database file format; therefore, changing the type of database for the applications would involve rewriting the applications, which may be tedious and labor intensive.

To that end, in accordance with aspects of the present disclosure, a solution for synchronizing distributed data files is presented. In some examples, a host node acquires a lock file including a first nodes-list and a second nodes-list from a central node storing a central copy of data files. The first nodes-list indicates identities of a first set of nodes having a latest version of the data files and a second nodes-list indicates identities of a second set of nodes that have modified the data files. If the identity of the host node is not indicated in the first nodes-list, a nearest node from the first nodes-list is identified. The host node obtains an updated portion of a latest version of the data files from the nearest node for synchronizing a local copy. The host node performs modifications on the local copy and updates the lock file by indicating the identity in the first nodes-list and the second nodes-list. The host node then provides a modified portion of the local copy to the central node for synchronizing the central copy with the local copy. As will be appreciated, examples presented herein facilitate enhanced synchronization of distributed data files. Examples presented herein ensure that modifications or transactions performed by plurality of participating nodes are retrieved and applied in the correct order before making a transaction in the local copy. The efficient synchronization of the distributed data files may provide enhanced performance and execution of the workloads on the target environments (e.g., clusters of workload orchestration systems) either in a customers on-premise private cloud datacenter owned or leased by the customer or consumed as a public cloud providers as-a-service offering (e.g., through a pay-per-use or consumption-based financial model). Further, enhanced synchronization of distributed data files as effected by various example aspects presented herein reduces or eliminates the iterative acquisition of lock files by a host node for synchronizing transactions initiated by each thread in the workload. For instance, the host node may complete modifications or transactions performed by threads in a workload and then release the lock file back to the central node. Moreover, examples presented herein also provide efficient synchronization of distributed data files whenever a new workload instance is deployed over a wide area network.

Referring now to the drawings, in FIG. 1, a networked system 100 is depicted, in accordance with an example, The networked system 100 may include a plurality of nodes 102, 104, 106, and a central node 108, coupled to each other via a network 110. In some examples, the networked system 100 may be a distributed system where the nodes 102-106 and the central node 108 may be located at physically different locations (e.g., on different racks, on different enclosures, in different buildings, in different cities, in different countries, and the like) while being connected via the network 110. In yet another example, the central node 108 and nodes 102-106 may be co-located.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 110 may be enabled via a wired (e.g., copper, optical communication, etc.) or wireless communication technologies. In some examples, the network 110 may be enabled via private communication links including, but not limited to, communication links established via wireless, wired (e.g., copper), and the like. In some examples, the private communication links may be direct communication links between the nodes 102-106, and the central node 108.

Each node 102-106 may facilitate resources, for example, compute, storage, and/or networking capabilities, for one or more workloads to execute thereon. The nodes 102-106 may be systems including a processor or microcontroller and/or any other electronic component, or a device or system that may facilitate various compute and/or data storage services. The nodes 102-106 may have similar or varying hardware and/or software configurations in a given implementation of the networked system 100. In some examples, the central node 108 may facilitate storage and networking capabilities, for centrally storing data files associated with the workloads. Alternatively, in other examples, the central node may also facilitate compute capabilities for executing the one or more workloads. Examples of the nodes 102-106 and the central node 108 may include, but are not limited to, a server, clusters of servers, container-orchestration systems, clusters of container-orchestration systems, a computer appliance, a workstation, a desktop computer, a laptop, a smartphone, a storage system, or a converged or hyperconverged system, and the like. Further, in certain examples, the nodes 102-106 may be a virtual machine or a containerized application executing on hardware in the networked system 100. By way of example, while some nodes 102-106 may have high-end compute capabilities, some nodes may facilitate strong data security, and certain nodes may have enhanced thermal capabilities.

In some examples, the nodes 102-106 may include a processing resource 112, 114, 116 and a machine-readable medium 118, 120, 122. The machine-readable medium 118-122 may be any electronic, magnetic, optical, or other physical storage device that may store data and/or executable instructions 124, 126, 128. For example, the machine-readable medium 118-122 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 118-122 may be non-transitory. As described in detail herein, the machine-readable medium 118-122 may be encoded with the executable instructions 124-128 to perform one or more methods, for example, methods described in FIGS. 3, 4, and 6.

In some examples, the nodes 102-106 may execute workloads 130, 132, 134. In an example implementation, the workloads 130-134 may be different instances of the same workload. The term workload may refer to a computing resource including, but not limited to, an application (e.g., machine-executable instructions), a virtual machine (VM), a container, a pod, or a containerized application. In some examples, workloads 130-134 may include any code that may be developed as a microservice. As will be understood, a workload such as a VM may be an instance of an operating system hosted on a given node via a VM host program, such as a hypervisor. Further, a workload such as a container may be a packaged application with its dependencies (e.g., operating system resources, processing allocations, memory allocations, etc.) hosted on a given node via a container host programs such as a container runtime (e.g., Docker Engine), for example. Further, in some examples, workloads may include pods that are formed by grouping one or more containers. For example, a set of containers that are associated with a common application may be grouped to form a pod.

In the description, the workloads 130-134 are described as being applications and the nodes 102-106 are described as servers in distinct data centers located in various geographical locations, for illustration purposes. In the example of FIG. 1, the nodes 102-106 may be considered to host different instances of the same workload. The nodes 102-106 may facilitate execution of any number of workloads 130-134 depending on respective hardware and/or software configurations. Each node 102-106 may also facilitate on-disk databases for storing a local copy of the data files associated with the workload instances 130-134 hosted in the respective node. In some examples, the nodes 102-106 may include a combination of different types of storage such as disks, flash memory, solid-state drives (SSDs), etc. In various examples, the local copy of the data files 136-140 may be embedded into the end of the workload 130-134 as an embedded database for local storage. Examples of the embedded database may include relational database management systems, key-value database libraries, multi-threaded disk-based tables, transactional database engines, and the like.

Further, the processing resource 112-116 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 124-128 stored in the machine-readable medium 118-122, or combinations thereof. The processing resource 112-116 may fetch, decode, and execute the instructions 124-128 stored in the machine-readable medium 118-122 to synchronize the data files associated with the workload (described further below). As an alternative or in addition to executing the instructions 124-128, the processing resource 112-116 may include at least one integrated circuit (IC), control logic, electronic circuits, or combinations thereof that include a number of electronic components for performing the functionalities intended to be performed by the node 102-106. Moreover, in certain examples, where the node 102-106 may be a virtual machine or a containerized application, the processing resource 112-116 and the machine-readable medium 118-122 may represent a processing resource and a machine-readable medium of the hardware or a computing system that hosts the node 102-106 as the virtual machine or the containerized application.

In FIG. 1, although the networked system 100 is shown to include three nodes 102-106, the networked system 100 may include any number of nodes, without limiting the scope of the present disclosure. Similarly, although a single central node 108 is shown, the networked system 100 may include more than one central node 108 located in different geographical locations, without limiting the scope of the present disclosure. For explanation purposes, the node 102 may hereinafter be referred to as the host node or a processor-based system 102. Similarly, the nodes 104, 106 may hereinafter collectively be referred to as participating host nodes or participating nodes 104, 106.

Figures 2A, 2B:
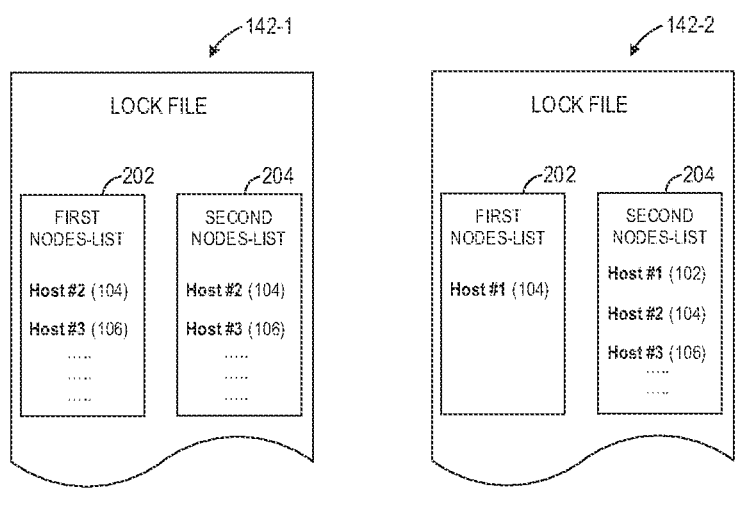
FIGS. 2A and 2B depict lock files, in accordance with an example.

During operation of the host node 102, the processing resource 112 may acquire a lock file 142 from the central node 108, which may store a central copy of the distributed data files 144 associated with the workload instances 130-134 distributed across the network 110. The distributed data files may be transactional data files or shared data files system. The distributed data files may be ACID (atomicity, consistency, isolation, durability) compliant database files. Throughout the description, the terms "data files" and "distributed data files" may be interchangeably used. FIGS. 2A and 2B depict examples of the lock file 142. As shown in FIG. 2A, the lock file 142 may include a first nodes-list 202 and a second nodes-list 204. In some examples, the first nodes-list 202 may indicate identities of a first set of nodes having a latest version of the data files and the second nodes-list 204 may indicate identities of a second set of nodes that have recently performed modifications on the data files. The second nodes-list 204 may indicate the second set of nodes in the order in which the nodes have modified the data files. The identity of the node, which may have performed the latest modification, is indicated at top, i.e., as the first entry, in the list. For instance, in the lock file 142-1, the first node identity (indicated at the top of the second nodes-list 204) is Host #2, which indicates that host 104 may have performed the latest modifications on the data files.

In some examples, on acquiring the lock file 142 by a node (e.g.: host node 102), the central copy of data files 144 may be prevented or disabled from modification by other hosts (e.g.: participating nodes 104, 106) in the network 110. In some examples, a locking mechanism, such as a Portable Operating System Interface (POSIX) lock, may be implemented to lock the central copy of data files 144 from modification by other nodes 104, 106. In some examples, acquiring the lock file 142 may include implementing a filesystem-at-userspace (FUSE) interface for creating a remote call request to the central node 108 for exclusive read/write privileges to the central copy of data files 144.

Referring back to FIG. 1, the processing resource 112 may check whether the identity of the host node 102 matches with the identities specified in the first nodes-list 202 in the lock file 142. If the identities do not match, then the processing resource 112 may identify a nearest participating node 104, 106 having the latest version of the data files from the first set of nodes in the first nodes-list 202. The processing resource 112 may obtain an updated portion of the latest version of the data files from the identified nearest participating node 104, 106. The processing resource 112 may synchronize the local copy of the data file 136 with the latest version using the updated portion. The processing resource 112 may modify the local copy of the data files 136 after synchronization. In some examples, modifying may include adding, deleting, or updating rows in a database table included in the data files (as described herein with respect to FIGS. 5A-5D).

After modifying the local copy of data files 136, the processing resource 112 may update the lock file 142 by indicating the identity of the host node 102 in the first nodes-list 202 and the second nodes-list 204. In some examples, updating the lock file 142 after modification may include erasing or removing the identities of first set of nodes in first nodes list 202 and indicating the identity of the host node 102. As shown in FIG. 2B, the "Host #2" and "Host #3" are erased from the lock file 142-1, and "Host #1" is indicated in the first nodes-list 202 in the lock file 142-2. Further, the identity of the host node 102 is appended to the top, i.e., as the first entry on the second nodes-list 204. Therefore, the second nodes-list 204 indicates "Host #1" above "Host #2", which previously modified the data files, In some examples, the identity of the host nodes may be indicated with IP addresses of the respective host nodes.

The processing resource 112 may provide the modified portion of the local copy of the data files 136 to the central node 108 for synchronizing the central copy of the data files 144 with the modified local copy of the data files 136. The host node 102 may then release the lock file 142 back to the central node 108 and the lock file 142 may be made available for acquisition to the participating nodes 104, 106. As will be appreciated, the nodes 102-106 presented herein facilitates improved deployment and execution of the workload instances 130-134. In particular, by virtue of enhanced synchronization of the data files as effected by various example aspects presented herein, workload instances 130-134 may be executed on a well-equipped host node having sufficient resources to fulfill requirements of the workloads. Synchronizing the data files associated with the workloads may enable enhanced performance and execution of workloads on networked systems (e.g., clusters of workload orchestration systems) on customer's premise or as-a-service offering. Moreover, the synchronization of the data files may be performed after bulk modifications of the data files by plurality of threads of the workload 130-134, and thereby reducing latency and bandwidth issues (described herein in more detail with respect to FIG. 4).

Figure 3:
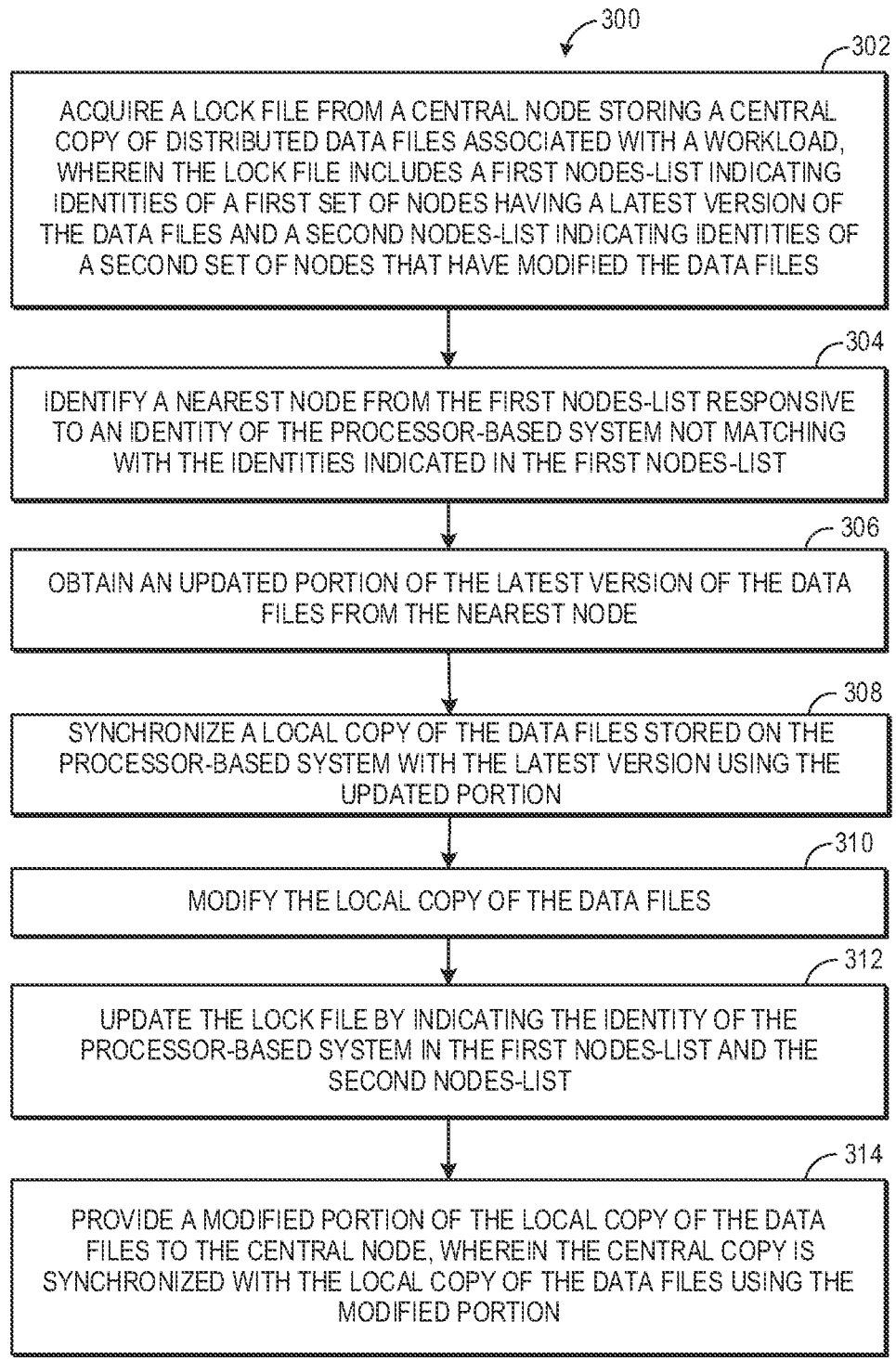
FIG. 3 is a flow diagram depicting a method for synchronizing distributed data files, in accordance with another example.

Referring now to FIG. 3, a flow diagram depicting a method 300 for synchronizing data files in a distributed network 110 is presented, in accordance with an example. For illustration purposes, the method 300 will be described in conjunction with the networked system 100 of FIG. 1. The method 300 may include method blocks 302, 304, 306, 308, 310, 312 and 314 (hereinafter collectively referred to as blocks 302-314) which may be performed by a processor-based system such as, for example, the host node 102. In particular, the operations at each of the method blocks 302-314 may be performed by the processing resource 112 by executing the instructions 124 stored in the machine-readable medium 118 (see FIG. 1). Moreover, it is to be noted that in some examples, the order of execution of the blocks 302-314 may be different than shown in FIG. 3. For example, the blocks 302-314 may be performed in series, in parallel, or a series-parallel combination.

At block 302, the processing resource 112 may acquire the lock file 142 from the central node 108, which may store a central copy of data files 144 associated with the workload 130 in the network 110. As described earlier, the lock file 142 may include a first nodes-list indicating identities of a first set of nodes having a latest version of the data files and a second nodes-list indicating identities of a second set of nodes that have recently modified the data files, for example. In some examples, the size of lock file 142 may be minimal or negligible in comparison to the size of the data files (e.g.: the central copy of the data files 144). For example, the lock file 142 may be less than 1-2 megabytes of data, whereas the central copy of the data files 144 may be more than 20 megabytes in size.

The processing resource 112 may check whether the host node 102 possesses the latest version of the data files using the lock file 142. For instance, the processing resource 112 may check if the first nodes list indicates the identity of the host node 102. The processing resource 112 may identify a nearest participating node 104, 106 from the first nodes-list 202 if the identity of the host node 102 does not match with the identities indicated in the first nodes-list 202, at block 304. In some examples, the identification of the nearest participating node 104, 106 may be performed based on location or geographical proximity to the host node 102. In other examples, the identification of the nearest participating node 104, 106 may be based on least latency or highest bandwidth associated with the nodes 102-106.

Further, at block 306, the processing resource 112 may obtain an updated portion of the latest version of the data files from the nearest participating node 104, 106. At block 308, the processing resource 112 may synchronize the local copy of the data files 136 stored on the host node 102 with the latest version using the updated portion. Further, the processing resource 112 may modify the local copy of the data files 136. In some examples, modifying the local copy of the data files 136 may be initiated by a plurality of threads associated with the workload 130 (described herein in more detail with respect to FIG. 4). At block 312, the processing resource 112 may update the lock file 142 by indicating the identity of the host node 102 in the first nodes-list 202 and the second nodes-list 204. In some examples, updating the first nodes-list 202 after the modification may include removing the identities of the first set of nodes and indicating the identity of the host node 102 in the first nodes-list. In some examples, updating the second nodes-list 204 may include appending the identity of the host node 102 on top of the second set of nodes 204. Further, at block 314, the processing resource 112 may provide a modified portion of the local copy of the data files 136 to the central node 108 for synchronizing the central copy 144 with the local copy of the data files 136 using the modified portion. In some examples, when a new instance of the workload is deployed on a new node in the network, then the method may further include acquiring the lock file 142 from the central node 108 and retrieve the central copy of data files 144 from the central node 108. The modification may be performed in a similar manner as described in method blocks 302-314.

Figure 4:
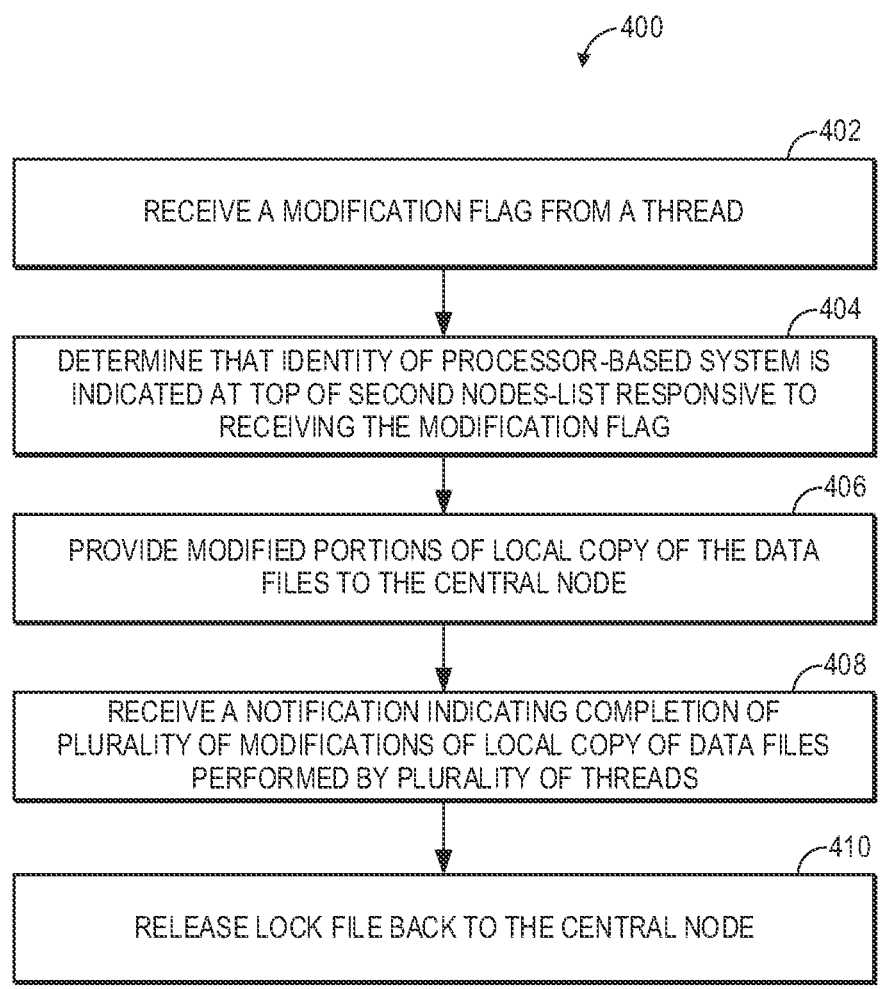
FIG. 4 is a flow diagram depicting a method for synchronizing distributed data files with bulk modifications performed by a plurality of threads associated with the workload, in accordance with an example.
Figure 5A:
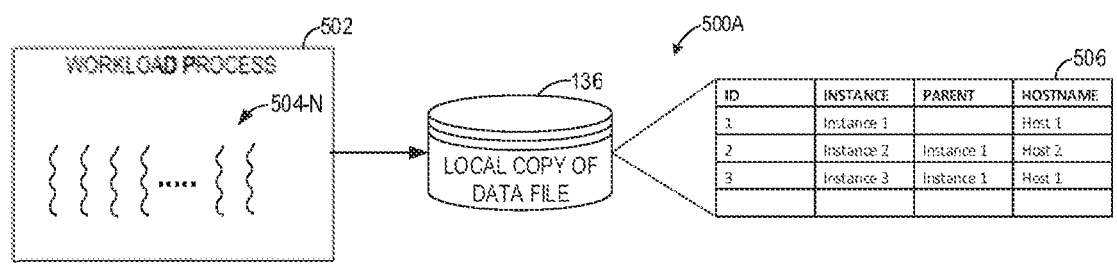
FIGS. 5A, 5B, 5C, and 5D depict modifications performed by threads associated with the workload on the data files, in accordance with an example.
Figure 5B:
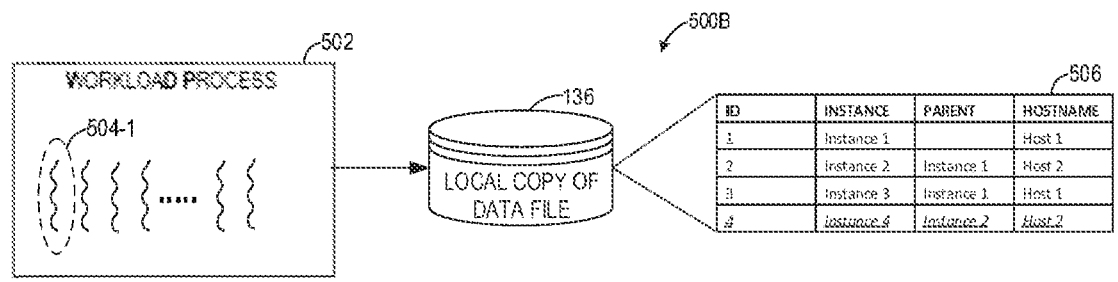
Figure 5C:
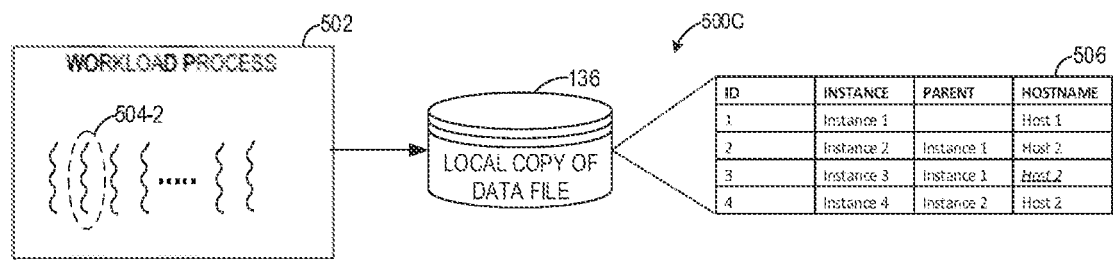
Figure 5D:
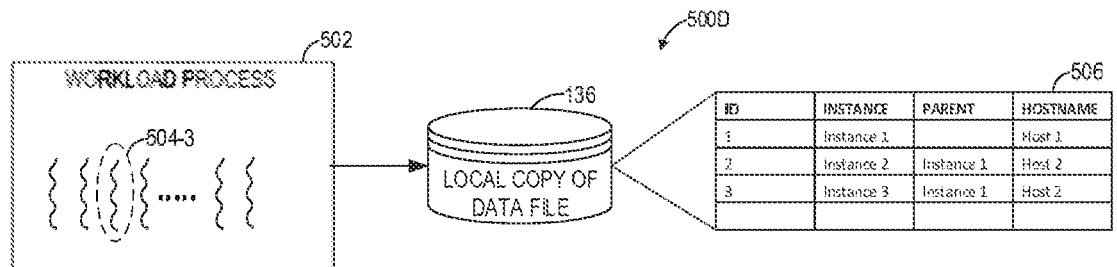

FIG. 4 is a flow diagram depicting a method for synchronizing data files involving modifications performed by a plurality of threads associated with the workload, in accordance with another example. At block 402, the processing resource 112 receives a modification flag from a thread of the workload 130. The modification flag may be a notification indicating that at least one thread associated with the workload 130 has modified the local copy of the data files 136. FIGS. 5A, 5B, 5C, and 5D depict the modifications performed by the threads associated with a workload on the data files, according to an example. As shown in 500A of FIG. 5A, a workload process 502 may include a plurality of threads 504-N. Each thread 504-N may be a sequence of instructions in the workload process 502 that may perform modifications or transactions on the local copy of data files 136. The local copy of the data files 136 may include transactional database table 506 having a plurality of rows and columns indicating key-value pairs of data.

In response to receiving the modification flag, the processing resource 112 may perform a double-check whether any modifications have been made using the lock file 142. For instance, at block 404, the processing resource 112 may check the lock file 142 and determine that the identity of the host node 102 is indicated at the top of the second nodes-list to confirm that a modification to the local copy of data files 136 has been made at the host node 102. In various examples, a plurality of modifications or bulk modifications of the local copy of data files 136 may be performed by the plurality of threads 504-N associated with the workload 130. As shown in 500B of FIG. 5B, the thread 504-1 may perform an addition operation of a new row of key value pairs (4, Instance 4, instance 2, Host 2) to the database table. In 500C of FIG. 5C, the thread 504-2 may perform an update operation by updating the hostname in row 3 on the database table. In 500D of FIG. 5D, the thread 504-3 may perform a deletion operation on the local copy of the data files 136 by deleting the key-value pairs in row 4 (4, Instance 4, instance 2, Host 2). The modifications by the plurality of threads 504-N may be performed serially or in parallel on the database table. In some examples, the plurality of threads may perform the modifications sequentially, i.e., wait until the modification by a thread is complete before performing the thread's own modification.

At block 406, the processing resource 112 may provide the modified portions of the local copy of the data files 136 to the central node 108. In some examples, the modified portions may be provided to the central node 108 in real time. Alternatively, the modified portions may be provided to the central node 108 after completion of modifications of an upstream transmission. The modified portions of the local copy of the data files 136 may include the delta modifications arising due to the plurality of modifications performed by the plurality of threads 504-N. In some examples, the modifications performed by each thread may be provided to the central node 108 in a single operation instead of providing the modifications separately. In response to determining that a modification has been made to the local copy of the data files 136, the processing resource 112 may wait for the modifications to be completed. For instance, at block 408, the processing resource 112 may wait until a notification is received that indicates completion of the plurality of modifications of the local copy of the data files 136 performed by the plurality of threads 504-N. In some examples, the processing resource 112 may execute the block 408 and then execute block 406, or vice-versa. In some examples, the processing resource 112 may execute the blocks 406 and 408 simultaneously. At block 410, the processing resource 112 may release the lock file 142 back to the central node 108 after providing the modified portions. On releasing the lock file 142, other participating host nodes 104, 106 may be able to access the central copy of data files 144 and the lock file 142. For instance, the participating host node 104 may acquire the lock file 142 and perform the method depicted in FIGS. 3 and 4.

Figure 6:
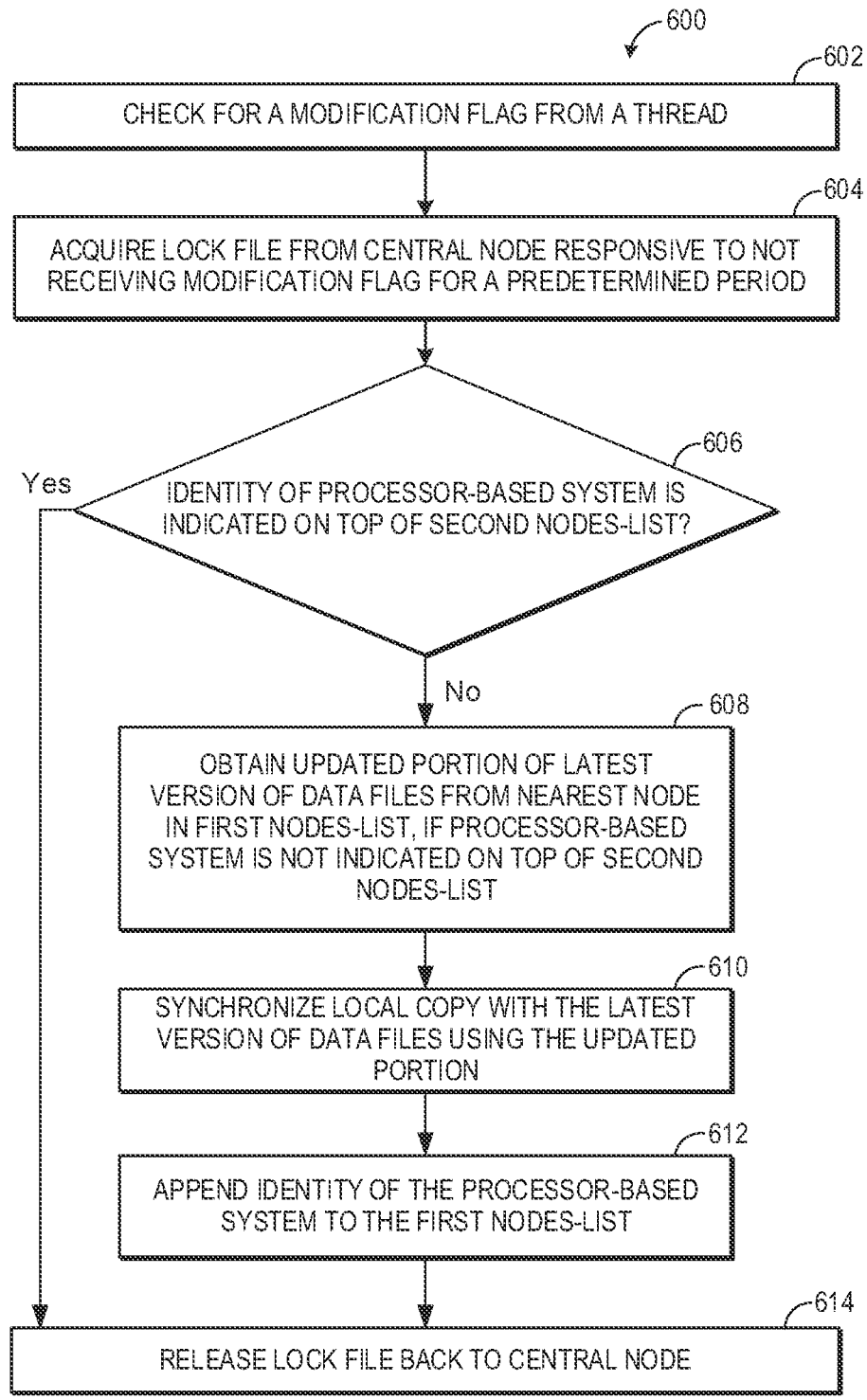
FIG. 6 is a flow diagram depicting a method for synchronizing data files in a distributed network at regular intervals, in accordance with an example.

FIG. 6 is a flow diagram depicting a method for synchronizing data files in the distributed network 110 at regular intervals, in accordance with an example. At block 602, the processing resource 112 may check whether a modification flag is received from a thread 504-N associated with the workload 130. If the modification flag is not received for a predetermined period, the processing resource 112 may acquire the lock file 142 from the central node 108, at block 604. At block 606, the processing resource 112 may check whether the identity of the host node 102 is indicated on top of the second nodes-list 204. If the identity of the host node 102 is indicated on top of the second nodes-list 204, the lock file 142 may be release back to the central node 108. If the identity of the host node is not indicated on top of the second nodes-list 204, the host node 102 may obtain the latest copy from another node 104, 106. At block 608, the processing resource 112 may obtain updated portion of latest version of the data files from a nearest node indicated in the first nodes-list 202. At block 610, the processing resource 112 may synchronize the local copy of data files 136 with the latest version of the data files using the updated portion obtained from the nearest node. At block 612, the processing resource 112 may append the identity of the host node 102 to the first nodes-list 202. At block 614, the processing resource 112 may release the lock file 108 back to the central node 108.

Figure 7:
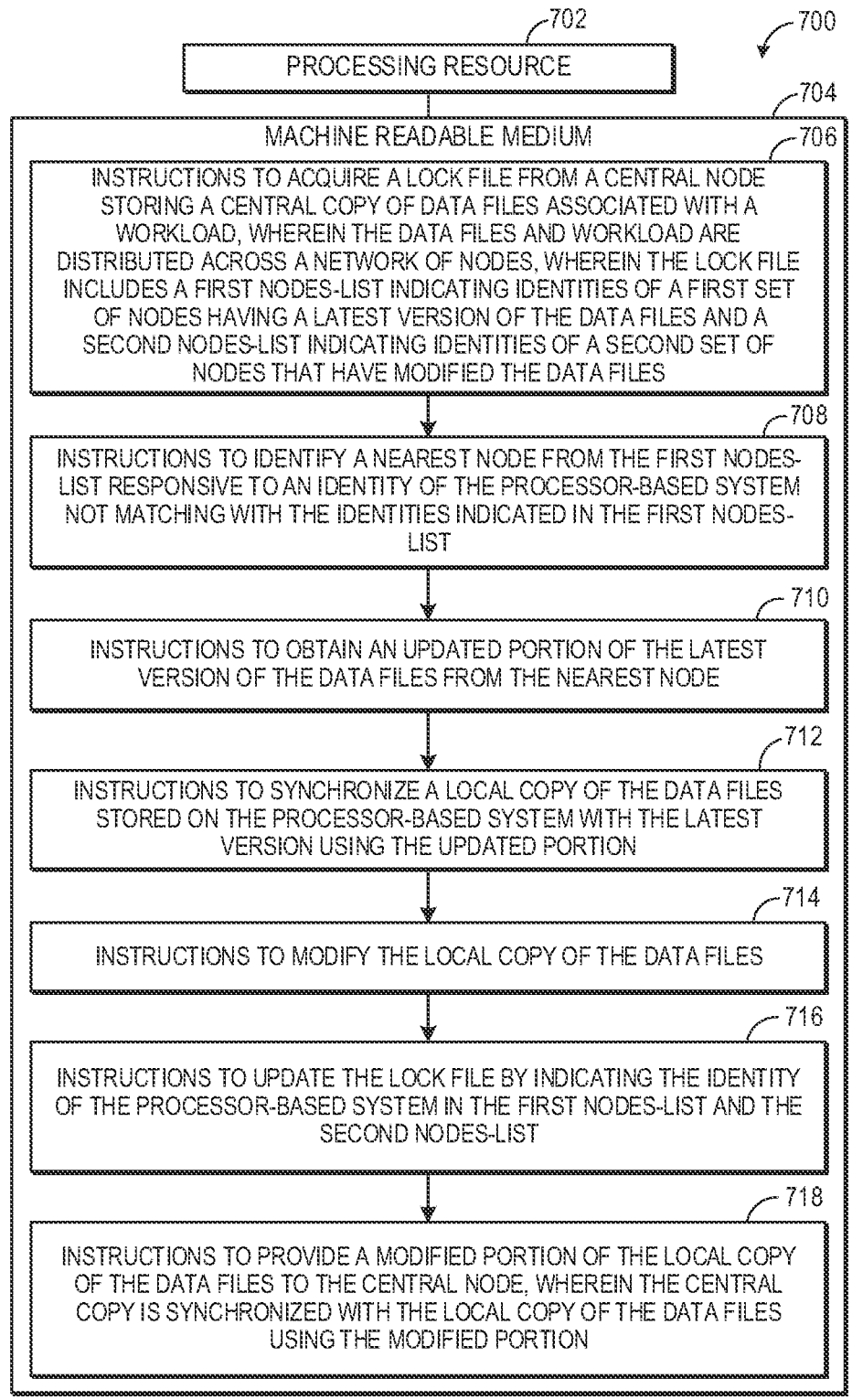
FIG. 7 is a block diagram depicting a processing resource and a machine-readable medium encoded with example instructions to synchronize data files in a distributed network, in accordance with an example.

Moving to FIG. 7, a block diagram 700 depicting a processing resource 702 and a machine-readable medium 704 encoded with example instructions to facilitate synchronization of data files 136-140 associated with workloads 130-134, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 112 of the host node 102. Further, the machine-readable medium 704 may represent one example of the machine-readable medium 118 of the host node 102.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, 710, 712, 714, 716, and 718 (hereinafter collectively referred to as instructions 706-718) for performing the method 300 described in FIG. 3. Although not shown, in some examples, the machine-readable medium 704 may be encoded with certain additional executable instructions to perform the method 300 of FIG. 3, and/or any other operations performed by the node 102, without limiting the scope of the present disclosure.

The processing resource 702 may be a physical device, for example, one or more CPU, one or more semiconductor-based microprocessor, one or more GPU, ASIC, FPGA, other hardware devices capable of retrieving and executing the instructions 706-718 stored in the machine-readable medium 704, or combinations thereof. In some examples, the processing resource 702 may fetch, decode, and execute the instructions 706-718 stored in the machine-readable medium 704 to synchronize the data files of the workloads deployed on one or more nodes 102-106 and the central node 108. In certain examples, as an alternative or in addition to retrieving and executing the instructions 706-718, the processing resource 702 may include at least one IC, other control logic, other electronic circuits, or combinations thereof that include a number of electronic components for performing the functionalities intended to be performed by the host node 102 of FIG. 1.

The instructions 706, when executed by the processing resource 702, may cause the processing resource 702 to acquire the lock file 142 from the central node 108, which stores the central copy of data files 144 associated with the workload distributed across the network 110. As described earlier, the lock file 142 includes the first nodes-list indicating identities of a first set of nodes having a latest version of the data files and a second nodes-list indicating identities of a second set of nodes that have modified the data files. Further, the instructions 708 when executed by the processing resource 702 may cause the processing resource 702 to identify a nearest node from the first nodes-list responsive to an identity of the processor-based system not matching with the identities indicated in the first nodes-list. Furthermore, the instructions 710 when executed by the processing resource 702 may cause the processing resource 702 to obtain an updated portion of the latest version of the data files from the nearest node. Moreover, the instructions 712 when executed by the processing resource 702 may cause the processing resource 702 to synchronize a local copy of the data files stored on the node 102 with the latest version using the updated portion. Further, the instructions 714 when executed by the processing resource 702 may cause the processing resource 702 to modify the local copy of the data files. The instructions 716 when executed by the processing resource 702 may cause the processing resource 702 to update the lock file by indicating the identity of the node 102 in the first nodes-list and the second nodes-list. The instructions 712 when executed by the processing resource 702 may cause the processing resource 702 to provide the modified portion of the local copy of the data files to the central node 108 for synchronizing the central copy with the local copy of the data files.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A method comprising:
   acquiring, by a processor-based system, a lock file from a central node storing a central copy of data files associated with a workload, wherein the data files and the workload are distributed across a network of nodes, and wherein the lock file includes a first nodes-list indicating identities of a first set of nodes having a latest version of the data files and a second nodes-list indicating identities of a second set of nodes that have modified the data files;
   identifying, by the processor-based system, a nearest node from the first nodes-list responsive to an identity of the processor-based system not matching with the identities indicated in the first nodes-list;
   obtaining, by the processor-based system, an updated portion of the latest version of the data files from the nearest node;
   synchronizing, by the processor-based system, a local copy of the data files stored on the processor-based system with the latest version using the updated portion;
   modifying, by the processor-based system, the local copy of the data files;
   updating, by the processor-based system, the lock file by indicating the identity of the processor-based system in the first nodes-list and the second nodes-list; and
   providing, by the processor-based system, a modified portion of the local copy of the data files to the central node, wherein the central copy is synchronized with the local copy of the data files using the modified portion.

2. The method of claim 1, wherein modifying the local copy of the data files is performed by a plurality of threads associated with the workload, and wherein modifying comprises adding, deleting, or updating of rows in the local copy of the data files.

3. The method of claim 2, further comprising:
   receiving, by the processor-based system, a notification indicating completion of a plurality of modifications of the local copy of the data files performed by the plurality of threads; and
   providing, by the processor-based system, a modified portion including the plurality of modifications of the local copy of the data files to the central node, wherein the central copy is synchronized with the local copy of the data files using the modified portion.

4. The method of claim 3, further comprising: releasing the lock file back to the central node after synchronizing the central copy with the local copy of the data files.

5. The method of claim 1, further comprising: retrieving the central copy of the data files from the central node in response to deploying a new instance of the workload.

6. The method of claim 1, wherein updating the lock file further comprises:
   removing, by the processor-based system, the identities of the first set of nodes in the first nodes-list;
   indicating, by the processor-based system, the identity of the processor-based system in the first nodes-list; and
   appending, by the processor-based system, the identity of the processor-based system on top of the second nodes-list.

7. The method of claim 1, further comprising disabling modification of the central copy of the data files by the nodes in response to acquiring the lock file from the central node.

8. The method of claim 1, wherein identifying the nearest node comprises selecting the node from the first nodes-list based on location, bandwidth, or latency associated with the node.

9. A system comprising:
   a processing resource;
   a machine-readable medium storing instructions that, when executed by the processing resource, cause the processing resource to:
      acquire a lock file from a central node storing a central copy of data files associated with a workload, wherein the data files and the workload are distributed across a network of nodes, and wherein the lock file includes a first nodes-list indicating identities of a first set of nodes having a latest version of the data files and a second nodes-list indicating identities of a second set of nodes that have modified the data files;
      identify a nearest node from the first nodes-list responsive to an identity of the system not matching with the identities indicated in the first nodes-list;
      obtain an updated portion of the latest version of the data files from the nearest node;
      synchronize a local copy of the data files stored on the system with the latest version using the updated portion;
      modify the local copy of the data files;
      update the lock file by indicating the identity of the system in the first nodes-list and the second nodes-list; and
      provide a modified portion of the local copy of the data files to the central node, wherein the central copy is synchronized with the local copy of the data files using the modified portion.

10. The system of claim 9, wherein the workload comprises a plurality of threads modifying the local copy of the data files, wherein modifying the local copy of the data files comprises adding, deleting, or updating of rows in the data files.

11. The system of claim 10, wherein the processing resource executes one or more of the instructions to:
receive a notification indicating completion of a plurality of modifications of the local copy of the data files performed by the plurality of threads; and
provide a modified portion including the plurality of modifications of the local copy of the data files to the central node, wherein the central copy is synchronized with the local copy of the data files using the modified portion.

12. The system of claim 11, wherein the processing resource executes one or more of the instructions to release the lock file back to the central node after synchronizing the central copy with the local copy of the data files.

13. The system of claim 9, wherein to update the lock file, the processing resource executes one or more of the instructions to:
remove the identities of the first set of nodes in the first nodes-list;
indicate the identity of the system in the first nodes-list; and
append the identity of the system on top of the second nodes-list.

14. The system of claim 9, wherein to identify the nearest node, the processing resource executes one or more of the instructions to select the node from the first nodes-list based on location, bandwidth, or latency associated with the node.

15. The system of claim 9, wherein the workload includes an application, container, a pod, a virtual machine, or a containerized application.

16. A non-transitory machine-readable medium storing instructions executable by a processing resource, the instructions comprising:
instructions to acquire a lock file from a central node storing a central copy of data files associated with a workload, wherein the data files and the workload are distributed across a network of nodes, and wherein the lock file includes a first nodes-list indicating identities of a first set of nodes having a latest version of the data files and a second nodes-list indicating identities of a second set of nodes that have modified the data files;
instructions to identify a nearest node from the first nodes-list responsive to an identity of a system not matching with the identities indicated in the first nodes-list;
instructions to obtain an updated portion of the latest version of the data files from the nearest node;
instructions to synchronize a local copy of the data files stored on the system with the latest version using the updated portion;
instructions to modify the local copy of the data files;
instructions to update the lock file by indicating the identity of the system in the first nodes-list and the second nodes-list; and
instructions to provide a modified portion of the local copy of the data files to the central node, wherein the central copy is synchronized with the local copy of the data files using the modified portion.

17. The non-transitory machine-readable medium of claim 16, further comprising instructions to:
receive a notification indicating completion of a plurality of modifications of the local copy of the data files performed by a plurality of threads associated with the workload; and
provide a modified portion including the plurality of modifications of the local copy of the data files to the central node, wherein the central copy is synchronized with the local copy of the data files using the modified portion.

18. The non-transitory machine-readable medium of claim 17, further comprising instructions to release the lock file back to the central node after synchronizing the central copy with the local copy of the data files.

19. The non-transitory machine-readable medium of claim 16, wherein the instructions to update the lock file further comprising instructions to:
remove the identities of the first set of nodes in the first nodes-list;
indicate the identity of the system in the first nodes-list; and
append the identity of the system on top of the second nodes-list.

20. The non-transitory machine-readable medium of claim 16, further comprising instructions to disable modification of the central copy of the data files by the nodes in response to acquiring the lock file from the central node.

* * * * *